Figure 1:
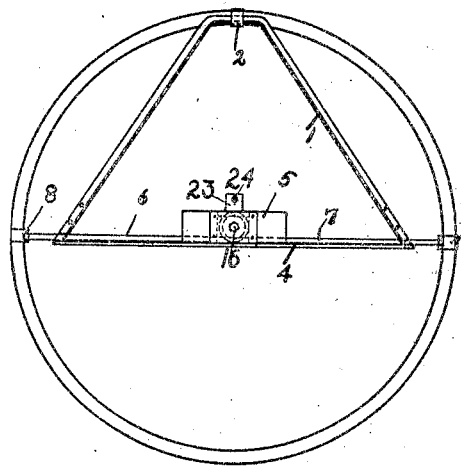

H. KAPLAN.
TIRE OR RIM CARRIER.
APPLICATION FILED MAY 21, 1917.

1,305,220.

Patented May 27, 1919.

INVENTOR.
Henry Kaplan.

BY
Carles P. Griffin
ATTORNEY.

UNITED STATES PATENT OFFICE.

HENRY KAPLAN, OF SAN FRANCISCO, CALIFORNIA, ASSIGNOR TO LONG MANUFACTURING COMPANY, OF SAN FRANCISCO, CALIFORNIA, A CORPORATION OF CALIFORNIA.

TIRE OR RIM CARRIER.

1,305,220.  Specification of Letters Patent.  Patented May 27, 1919.

Application filed May 21, 1917. Serial No. 169,940.

*To all whom it may concern:*

Be it known that I, HENRY KAPLAN, a citizen of the United States, residing at San Francisco, in the county of San Francisco, State of California, have invented a new and useful Tire or Rim Carrier, of which the following is a specification in such full and clear terms as will enable those skilled in the art to construct and use the same.

This invention relates to a tire carrier, and its object is to produce a tire carrier which is capable of holding different sized rims securely, as well as unmounted tires, if such are desired to be carried.

Another object of the invention is to provide a tire carrier which may have the tire easily locked in place thereon either when assembled upon the rim or when dismounted therefrom.

Another object of the invention is to provide a tire carrier capable of carrying two tires either or both of which may be assembled upon the rim or dismounted therefrom.

Other objects of the invention will appear as the description proceeds.

An embodiment of the invention is shown in the drawings in which the same reference numeral is applied to the same portion throughout, but I am aware that there may be modifications thereof.

Figure 2:
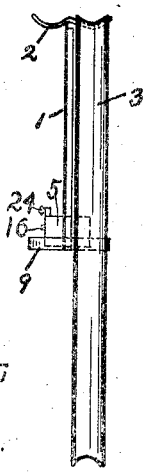
Figure 3:
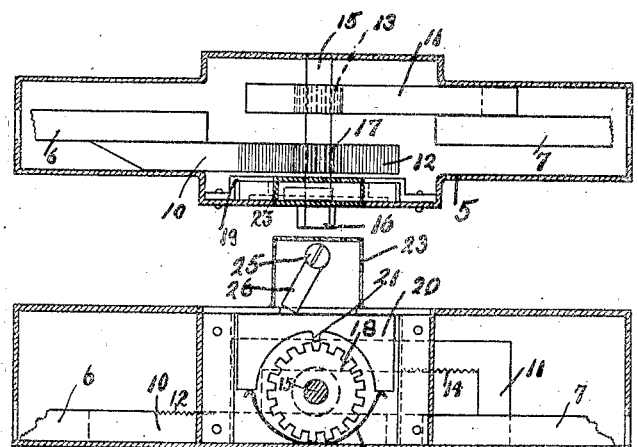
Figure 5:
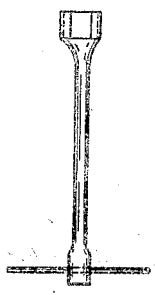
Figure 4:
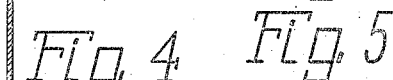
Figure 6:
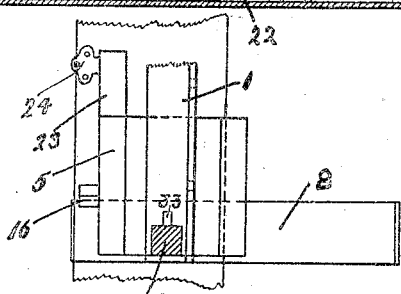
Figure 8:
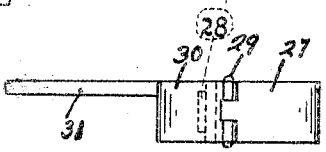
Figure 7:
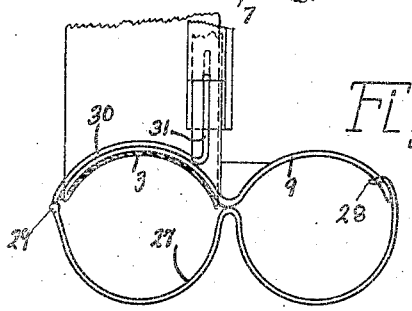

Figure 1 is a front elevation of the tire carrier showing the empty rim in place thereon, Fig. 2 is a side elevation of the rim and carrier looking in the direction of the arrow Fig. 1, Fig. 3 is a horizontal sectional view of the lock casing and operating mechanism, Fig. 4 is a front elevation of the lock casing with the front of the lock casing removed for the purpose of illustration, Fig. 5 is a plan view of the wrench used for securing the tire or rim in position on the carrier, Fig. 6 is an end view of the lock casing showing one of the rim supports, Fig. 7 is a plan view of one of the rim supports showing the device for locking a dismounted tire in place on the carrier, and Fig. 8 is a side elevation of the device for locking the dismounted tire in place on the carrier.

The numeral 1 represents a substantially triangular angle iron frame having a member 2 at its top rigidly connected therewith, and curved to support two rims 3, one of which is shown in position on the carrier. The horizontal member 4 of the frame has a lock casing 5 at its center, in which two operating rods 6 and 7 extend. The operating rods 6 and 7 have curved members 8 and 9 respectively at their outer ends shaped the same as the member 2, and adapted to lock two tires in position on the carrier. The rods 6 and 7 are directly in line with each other, but have off set portions 10 11 in the top of which former are formed the rack teeth 12. The member 11 is slotted to receive the gear wheel 13, and it has rack teeth 14 above said gear wheel. The gear wheel 13 is carried by a shaft 15, which has a hexagonal head 16 on its outer end for the purpose of operating it. The shaft 15 is also provided with a gear wheel 17 in mesh with the rack 12. The shaft 15 also has a notched wheel 18 within the lock casing 5, and within an auxiliary lock casing 19. Slidable between the casing 5 and auxiliary lock casing 19 is a plate 20, which plate has a lug 21 formed therein adapted to take in the notches of the wheel 18. The plate 20 is normally held out of contact with the wheel 18 by means of a curved steel spring 22.

Secured above the casing 5 is the lock barrel casing 23, said lock being operated by any suitable form of key 24 capable of rotating the barrel 25 and turning the arm 26 down so as to bring the lug 21 into contact with the wheel 18 thereby locking the rods 6 and 7 in any given adjustment.

When it is desired to lock a rim in place on the carrier, the rim is placed upon the support 2. The curved members 8 and 9 are then retracted so as to come within the rim and are then expanded by the operation of the shaft 15, whereupon the key may be operated to lock the supports in engagement with the rim.

Since a dismounted tire is capable of being distorted, and in that way removed from such a carrier as this, it is necessary to provide means for encircling it to prevent its removal without the use of the key. This device consists of a doubly curved member 27 adapted to partially surround two tires, and having a projection 28 adapted to pass through a hole in the member 9. The member 30 is hinged to the other end of the member 27 at 29, and it has a long finger 31 which is adapted to overlie either the rod 7 or the rod 6, to which it may be applied, and when drawn in passes through a hole 33 in the frame 1, so that when drawn in, as shown in Fig. 7, it cannot be removed from the tire carrier, nor can the tire be removed therefrom.

Having thus described my invention what I claim as new and desire to secure by Letters Patent of the United States, is as follows, express reservation being made of permissible modifications.

1. An automobile tire or rim carrier comprising a triangular frame, a tire support at the top of the frame, slidable bars at the bottom of the frame adapted to contact with the inside of a tire or rim, means to move said bars outwardly against said tire or rim, means to lock said bars in any desired position, and a tire retainer comprising a plate adapted to be connected with one of said arms, and adapted to surround a tire engaged therewith, and having a projecting portion adapted to be pulled into engagement with an opening in the frame for locking a dismounted tire on the carrier.

2. An automobile tire or rim carrier comprising a frame, a tire support carried thereby, slidable arms for securing the tire in a fixed position on the support, means to move said arms outwardly against the tire or rim when placed upon the support, means to lock said arms in any given position, and a clamp for preventing the removal of a dismounted tire from the support consisting of a plate adapted to be connected with said arms and to surround the tire placed thereon, and a hinged member connecting with said plate, and having an extended arm adapted to pass through a hole in the frame when a tire is to be locked thereto dismounted from its rim.

In testimony whereof I have hereunto set my hand this 16th day of May, A. D. 1917.

HENRY KAPLAN.